July 4, 1967           L. A. MOE           3,328,908
ULTRASONIC PEST CONTROL AND EXTERMINATION SYSTEM
Filed Oct. 11, 1965
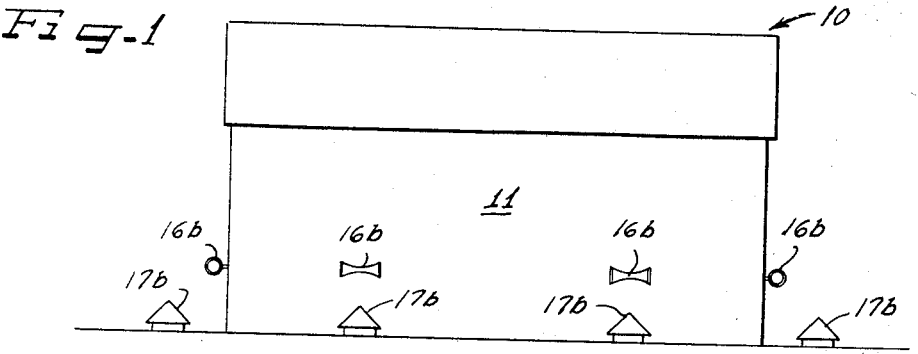
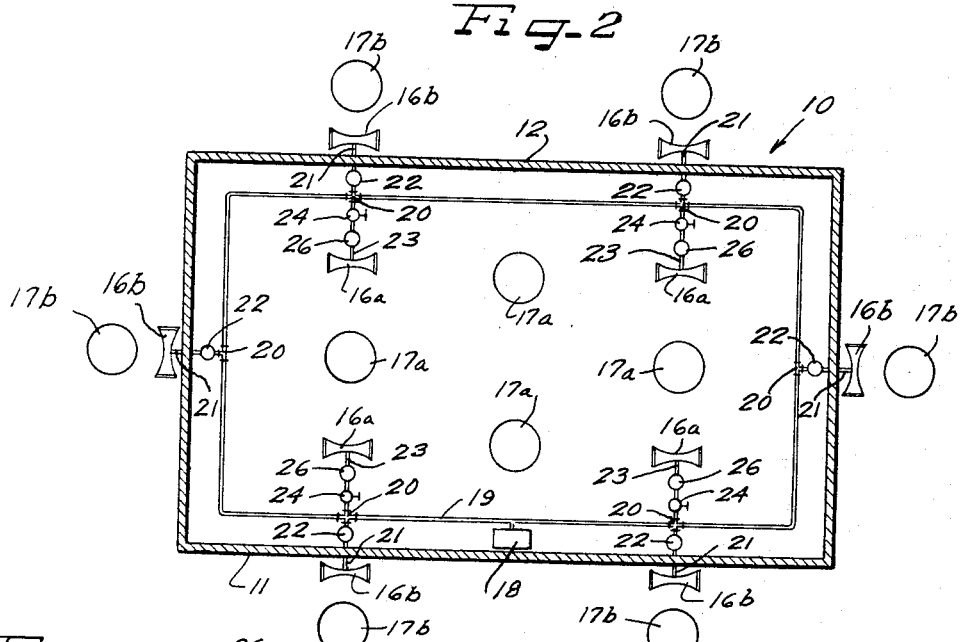
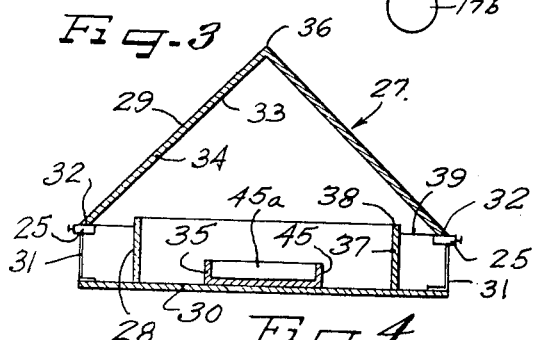
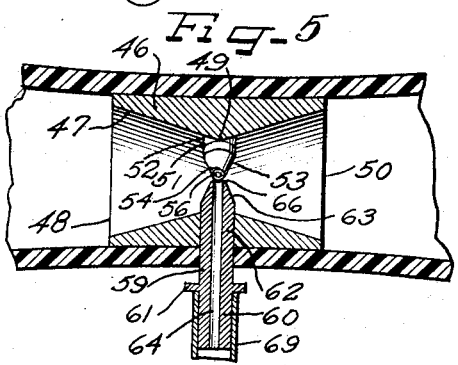
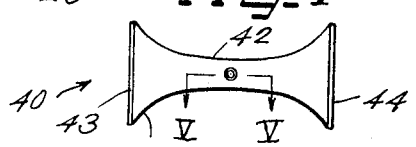
INVENTOR.
Lowell A. Moe
BY Hill, Sherman, Meroni, Gross & Simpson
ATTORNEYS United States Patent Office 3,328,908
Patented July 4, 1967

3,328,908
ULTRASONIC PEST CONTROL AND
EXTERMINATION SYSTEM
Lowell A. Moe, Minneapolis, Minn., assignor to Peavey Company, Minneapolis, Minn., a corporation of Minnesota
Filed Oct. 11, 1965, Ser. No. 500,473
9 Claims. (Cl. 43—131)

The present application is a continuation-in-part of an earlier application Ser. No. 284,630, filed May 31, 1963, and now abandoned.

This invention relates to pest control and more particularly to an improved method and apparatus for grouping and/or exterminating rodents and other undesirable small-cranium animals.

There are numerous methods and apparatus in the prior art for exterminating undesirable animals such as rodents. One conventional method for exterminating rats, for example, is to fumigate the rat-infested area with poison gas. Although this method has a positive killing effect, often times it is not feasible to use fumigation methods because of the collateral effects of the gas. For example, rats are attracted to storage bins for certain foodstuffs, such as grain elevator buildings but fumigation of such buildings might render the foodstuff stored therein unfit for human consumption. Further, while fumigation will rid and clear an area of rats for a given period of time, it does not afford a positive method of subsequently and continuously controlling rat infestation.

Another known method for controlling pests such as rodents involves the enveloping of a given area or a building with ultrasonic sound waves. Such sound waves have a serious adverse effect upon the brain of a small-cranium animal which causes the animal to retreat from the sound waves, but a disadvantage of this method is that the repelled animals migrate to another area which theretofore may have been free of the pests.

In accordance with the principles of the present invention, the disadvantages of the prior art are overcome and the general object of the present invention is to provide a method and apparatus for grouping and/or exterminating rodents or other undesirable small-cranium animals from a given area by means of utilizing the deleterious effects of ultrasonic sound waves on the nervous system of such animals. The present invention produces quick results, is inexpensive in installation, operation and maintenance, is suitable for installation in new and existing buildings and is efficient and continuous in its effect.

Important features of the present invention reside in the provision of means for enveloping a given area with ultrasonic sound waves, a series of shelter for the animals situated within the area enveloped by the ultrasonic sound waves and constructed such that the interiors thereof are substantially devoid of the ultrasonic sound waves to provide ultrasonic sound-free havens for the animals and if desired, poison bait or other exterminating agent for killing the animals.

Many other features, advantages and additional objects will become manifest to those versed in the art from the detailed description of the invention which follows and the accompanying sheet of drawings in which a preferred embodiment of the present invention is shown by way of illustrative example.

On the drawings:

FIGURE 1 is a side elevational view of a building such as a grain storage warehouse showing a portion of the ground surface area around the building and also illustrating apparatus constructed in accordance with the principles of the present invention being situated on the sides of the building and on the ground area around the building;

FIGURE 2 is a top sectional view of the building of FIGURE 1 and illustrates apparatus of the present invention disposed on, within and about the building;

FIGURE 3 is a vertical cross-sectional view of a mobile animal shelter of the present invention;

FIGURE 4 is a side elevational view of an ultrasonic sound transducer;

FIGURE 5 is a fragmentary enlarged vertical cross-sectional view taken on line V—V of the transducer of FIGURE 4.

As shown on the drawings:

Although the principles of the present invention are of utility in controlling infestation of rodents and other small-cranium animals from any building construction or area, a particularly useful application is made to buildings and areas containing foodstuffs and an illustrative embodiment of a building construction herein shown consists of a grain storage building.

In FIGURES 1 and 2, a grain storage building is shown generally at reference numeral 10 and comprises front and rear walls 11 and 12 and side walls 13 and 14. One of the important features of the present invention is in the utilization of high frequency sound waves as produced by ultrasonic sound transducers or generators. A plurality of such transducers situated within the building 10 are illustrated at $16_a$ and additional transducers are mounted on the outer periphery of the building as shown at $16_b$.

An understanding of the underlying principles of the generation of high frequency sound waves and their effects on the nervous system of small-cranium animals as contemplated in the present invention is necessary for the full understanding of the invention.

It has been well established through experimentation that small animals are adversely affected by high frequency sound waves which are beyond the audible frequency spectrum of human beings. For example, the upper limit of the normal audio hearing spectrum for humans is approximately 15,000 cycles per second. Sound waves having frequencies beyond this range cannot be heard by humans, nor do the sound waves have any effect on the nervous system of humans. However, sound waves having ultrasonic frequencies, that is, frequencies beyond approximately 15,000 cycles per second can be heard by and have a definite adverse effect upon small animals.

There appears to be a direct relation between the size of the cranium or the brain cavity of an animal and the adverse audio hearing spectrum of that animal. For example, an average sized rat can hear sound waves having much higher frequencies than those capable of being heard by a human. An ultrasonic sound wave of approximately 20,000 cycles per second not only can be heard by an averaged sized rat, but it also has an extremely irritating effect upon the nervous system of the rat. Hearing an ultrasonic sound wave of this frequency level will cause the rat to do almost anything to escape the unbearable sound, and will on occasion even destroy himself to end the suffering. On the other hand, a small field mouse, having a smaller brain cavity is not effected to this degree until the sound waves attain a frequency of approximately 21,000 cycles per second. It appears that a cockroach or a centipede, having still a smaller brain cavity, is not adversely effected until frequencies reaching 27,000 to 28,000 cycles per second are attained. Through theoretical projection, it appears that a mosquito, having an extremely small brain cavity, will not be affected at frequencies less than 37,000 cycles per second.

The present invention contemplates the use of a plurality of transducers to generate ultrasonic sound waves of various frequencies to provide an irritating effect upon the nervous system of the rats, and further contemplates the use of one or more animal shelters constructed such as to provide a substantially ultrasonic sound free haven in which the rats can congregate to avoid the effects of the ultrasonic sound waves. In order to initially attract the rats into the shelters a quantity of bait is placed within each of the shelters. Poison may be added to the bait, if desired.

In the drawings, a number of such shelters are situated within the building 10 as illustrated at reference numerals $17_a$ and an additional number of such shelters are situated about the outer periphery of the building as illustrated at $17_b$.

According to the present invention, assuming that a rodent colony is present within the building 10, the initial step in eliminating the colony is to generate ultrasonic sound waves of various frequencies within the building by means of transducers $16_a$. The frequencies of the sound waves and the decibel ratings are within given limits. A plurality of baited shelters are situated within the building as at $17_a$. The rats within the building are, first of all, extremely irritated by the sound, and secondly are attracted into the shelters by the bait. Once entering the shelters the rats are protected from the ultrasonic sound and remain there. The rats may be exterminated, if desired, within the shelters by any suitable exterminating agent, such as poison gas, or poison mixed with the bait.

After the rats have been eliminated from the interior of the building 10 the transducers $16_b$ situated about the outer periphery of the building 10 are activated to generate ultrasonic sound waves in the area surrounding the building 10 in order to eliminate rats who are in the habit of coming to the building 10 for food, but in such a manner that the rats are not merely impelled to go elsewhere for food.

The significance of this aspect of the invention will become more apparent when the habits of rats and the effects of ultrasonic sound on them is understood. First of all there usually develops in the area surrounding a source of food such as a grain elevator, food processing plant, etc., a colony of rats whose habit it is to approach the source of food when hungry, but generally to remain some distance away from the source of food. The irritating effects of ultrasonic sound waves on rats and other small-cranium animals are extremely noticeable, and the repellant effects of such sound waves have been utilized to keep rats away from food warehouses, grain elevators and similar buildings by enveloping the area immediately surrounding the buildings with ultrasonic sound waves.

Rodents who are in the habit of using the food warehouse as a source of food will approach the building but as soon as they are close to the building where the intensity of the ultrasonic sound waves is high, they are sufficiently irritated by the sound so that they retreat from the building. After repeated attempts to approach the building for food and after having been repelled by the ultrasonic sound waves each time the rats leave the area of the building and migrate elsewhere in search of another source of food.

A serious problem created by the use of the repellent effects of ultrasonic sound in this manner has been that the neighboring area into which the rodents migrate experiences an increase in its rodent population. Perhaps before the rats were driven away from the area around the ultrasonic sound enveloped warehouse, the other area to which the rats migrated was relatively rat-free, and now finds itself with a heavy rodent population.

Thus, while the employment of ultrasonic sound is extremely effective in eliminating a rodent problem in one area it may create a serious rodent problem in a neighboring area.

The present invention makes use of a advantageous effect of ultrasonic sound in irritating and repelling the rodents while avoiding the disadvantages of compelling the rats to migrate to a neighboring area. Thus, the bait in the shelters $17_b$ shown in the drawings, which shelters are constructed such as to be substantially interiorly free of ultrasonic sound when placed in an area enveloped by ultrasonic sound waves, attracts the animals into the shelters, but after entering the shelters the animals are relieved of the irritating effects of the ultrasonic sound waves and tend to remain within the shelters.

When a group of rats have congregated in a shelter the entire shelter may be picked up and removed to an exterminating area where the rats are killed. However the rats can also be killed directly within the shelters by means of any suitable lethal agent, such as gas, poison added to the bait etc.

In operation, one shelter $17_b$ placed around the periphery of the building 10 and the area around the building is enveloped with ultrasonic sound waves having a frequency in the order of at least 20,000 cycles per second and having a sound intensity within the range of about 15 to 100 decibels (reference: 0.000204 dyne per square centimeter), the rats will approach the building but will then retreat because of the ultrasonic sound after one or more unsuccessful efforts to obtain food from the building 10 the rats are attracted to the shelter $17_b$ by the bait situated therein. Once having entered the shelters the rats tend to remain until all of the bait is gone and the rats become extremely hungry because of the refuge from the sound provided by the shelters.

Conventional rat traps which are not specially constructed such as to be substantially interiorly free of ultrasonic sound waves when situated in an area enveloped by such sound waves are not effective in controlling the grouping of the animals or mass extermination for several reasons. First of all, although rodents are generally grouped into colonies they seldom actually eat together. It is very seldom that a rat will enter a conventional baited trap if even one other rat is presently within the trap, and the presence of another rat can be determined by the sense of smell. Even more reluctant is a rat to enter a trap in which a dead rat is present.

As a result, if conventional rat traps were utilized in combination with ultrasonic sound waves the system would be manifestly inadequate to provide effective grouping and/or extermination of the rodents since in most instances only one rat at a given time would be present in the trap, and furthermore, as soon as a dead rat was in the trap no other rats would enter, in almost all instances.

The utilization of the specially constructed shelters of the present invention, however, has the effect of compelling many rats to congregate in a single shelter, and this is so even if one or more dead rats are in the shelter.

In other words, the rats apparently lose much of their reluctance to congregate together in a shelter when the shelter is situated in an area enveloped by irritating ultrasonic sound waves but the interior of the shelter itself is substantially free of all ultrasonic sound waves. Thus the effective grouping and/or extermination of the rodents is increased many times over when the shelters of the present invention are utilized as compared with the utilization of conventional baited traps. In accordance with the principles of the present invention the shelters $17_a$ and $17_b$ are constructed such that regardless of the decibel rating of the ultrasonic sound waves surrounding the shelter, the shelters are effective, with respect to the interior thereof, in attenuating the power of the ultrasonic sound waves surrounding the shelter by a factor exceeding 99.3 percent. In other words, regardless of the decibel level of the ultrasonic sound waves surrounding the shelters, the power of the ultrasonic sound waves in the interior of the shelter has been reduced by at least 99.3 percent.

The number of transducers required within the building to effectively disseminate sufficient sound waves throughout the building depends upon certain parameters, among which are the power of the transducers being used, the size of the building, the materials of construction of the building and the type and quantity of grain or other material being stored within the building, if any. The number of sound shelters 17$_a$ which are employed is optional, and in FIGURE 2 a total of four shelters are illustrated. Of course, the use of a greater or lesser number of shelters will normally result in a faster or slower grouping and/or extermination period, respectively.

The number of transducers required about the outer periphery of the building in order to generate sufficient sound waves also depends upon certain parameters among which are the power of the transducers, the shape of the building and the length of the walls of the building. For example, in the case of the rectangular building 10 illustrated in the drawings, two transducers 16$_b$ are shown mounted on each of the longer front and rear walls 11 and 12, and only one transducer is mounted on each of the side walls 13 and 14. Preferably, transducers 16$_b$ are mounted on the outside walls approximately three feet from the ground level and are positioned so as to direct the generated sound waves in a horizontal direction and parallel to the wall. Where more than one transducer is mounted on a given wall the frequencies produced by the various transducers should be slightly different from each other to enhance the generation of modulating overtones.

Ultrasonic transducers of the type contemplated in the present invention are known in the prior art and consist of both the electronic and the fluid operated types.

Preferably, transducers 16$_a$ and 16$_b$ of the present invention are of the fluid operated type, which are inexpensive in manufacture, require no moving parts, will last indefinitely and can be operated from a supply of low pressure gas such as air. Accordingly, an air compressor 18 is illustrated in FIGURE 2 as being situated within the building 10 and connected to an air line 19 which extends around the inner periphery of the building 10. Adjacent each transducer 16$_b$, a pipe fitting 20 is provided in the air line 19 for teeing-off to a conduit 21 which extends through a corresponding wall of the building 10 to connect to a transducer 16$_b$. An adjustable air pressure reducing valve 22 is shown provided in each of the conduits 21 to selectively adjust the air pressure to each of the transducers 16$_b$, which effectively varies the frequency generated by the transducers in a manner to be described in detail hereinafter.

Also connected to each fitting 20 is a second conduit 23 which is provided with a hand shut-off valve 24 and a pressure reducing valve 26, and is connected to a transducer 16$_a$ situated within the building 10. Preferably, the pressure reducing valves 26 and the transducers 16$_a$ are threadedly connected to conduits 23 so that when the rats are eliminated from within the building 10 the hand valve 24 can be adjusted to a closed position and the valves 26 and the transducers 16$_a$ can be removed from the building to be used in another location.

Accordingly, pressurized air which is supplied from a source such as the air compressor 18 is piped through the air line 19 to conduits 21 and 23 and then to the pressurized fluid operated transducers 16$_b$ and 16$_a$ respectively. A variation in the pressure of the air as supplied to the transducers 16$_a$ and 16$_b$ can be accomplished by adjustment of the pressure reducing valves 22 and 26 respectively, and such variations result in variations in frequency of the sound waves as generated by the transducers.

Referring to FIGURE 3, an animal shelter 27 is shown constructed in accordance with the principles of the present invention specially to reflect ambient ultrasonic sound waves and comprises a body member 28 and a conical roof 29. The body member 28 is mounted on a thin circular floor plate 30, and in order to support the roof 29 in vertical spaced relation to the body member 28, a plurality of vertically upstanding rigid roof support brackets 31 are firmly affixed to the plate 30 about the outer periphery of the body member 28 and are connected to a lower edge 32 of the roof 29 by means of spring clips or the like connector as at 25 for easy removal of the roof 29.

The body member 28 is shaped such as to present a curved surface to the ultrasonic sound waves generated by the transducers in order to reflect such sound waves and in the illustrated embodiment the body 28 comprises a vertically upstanding side wall 37 which is substantially circularly shaped in horizontal cross-section and which terminates at an upper edge 38. As illustrated in the drawing, the lower edge 32 of the roof 29 is disposed vertically below and radially outwardly from the upper edge 38 of the body member 28 and there is defined therebetween an access or ingress area 39 through which rodents may enter the interior of the body member 28 over the upper edge 38 thereof. However, because of the offset arrangement of the access area 39, sound waves are substantially precluded from entering the interior of the body member 28 therethrough.

The conical shape of the roof 29 is also designed to have a high reflective effect on the ambient ultrasonic sound waves, and if desired a layer of sound deadening material 34 may be applied to an inner surface 33 of the roof 29.

A small tubular feeding tray 35 for receiving the bait is positioned on the plate 30 in the middle of the body member 28. The tray 35 comprises a circumferentially continuous upstanding wall 45 having an upper edge 45$_a$. The wall 45 is relatively shallow, and a number of rodents can congregate around the tray 35 and easily feed on the food deposited therein.

In a preferred embodiment the overall diameter of the floor plate 30 and the roof 29 is about 36 inches, the diameter of the side wall 37 is about 28 inches and the height of the side wall 37 is about 4 inches. The slope of the roof 29 is such that the distance between the upper edge 38 of the side wall 37 and the roof 29 is about 3 inches, and the overall height of the roof 29 is about 11 inches.

In FIGURES 4 and 5 a fluid operated ultrasonic sound transducer is illustrated generally at 40 and comprises a tubular double bell mouthed housing 41 having a narrow central throat portion 42 and two enlarged oppositely facing mouths 43 and 44 at the ends thereof. Mounted within the throat portion 42 is a hexagonal housing 46 which defines a converging and diverging passageway or venturi 47. The passageway converges inwardly from one end 48 and diverges from approximately a center 49 to another 50. The passageway 47 therefore presents a configuration whereby the cut-off apex of two frusto-conical passages are joined.

Threaded into one side of the housing 46 approximately at the center 49 is a resinator plug 51 having a threaded stem portion 52 and a frusto-conical end portion 53 which extends into the passageway 47. The end portion 53 defines a cylindrical resinator cavity 54 which opens at a sharp cleavage or cut-off apex 56.

An apertured injector tube 59 is threaded into another side of the housing 46 approximately at the center 49 and comprises an inlet stem portion 60, a flange 61, a threaded outlet stem portion 62, a frusto-conical outlet end portion 63 and defines a fluid passage 64 therethrough. The end portion 63 defines a sharp cleavage or cut-off apex end 66.

The inlet stem portion 60 is adapted to receive a pressurized fluid supply conduit 69 which corresponds to conduits 21 and 23 of FIGURE 2.

In operation, a stream of pressurized fluid such as air is injected from the mouth of the injected tube 59 to impinge upon the apex 56 of the plug 51 and envelop the mouth of the cavity 54. The sharp edge of the cavity mouth 54 cuts this stream with part of the stream being deflected into the cavity 54 while the remainder of the stream flows over the outer edge of the apex 56. The volume of the cavity 54 is related to the flow rate of the air stream to produce the desired frequency. The flow rate in turn is determined by the pressure of the air and the size of the passage 64. The air waves passing over the apex 56 are amplified in the throat portion 42 from whence they are directed from the transducer 40 through the transducer mouths 43 and 44.

The efficiency of the transducer 40 is generally increased as the distance between the apex ends 56 and 66 of the plug 51 and the tube 59, respectively, is decreased. The fluid operated transducer 40 as illustrated in the drawings will generally generate ultrasonic frequencies of from 18 to 30 kilocycles with an air pressure of from 1 to 3 pounds per square inch.

The transducer 40 will operate satisfactorily utilizing pressurized fluid other than air, and it is also within the contemplation of the present invention that other types of ultrasonic transducers, such as electronic high frequency transducers, may be utilized to generate the required ultrasonic sound waves.

Although minor modifications might be suggested by those versed in the art, it should be understood that I wish to embody within the scope of the patent warranted hereon all such modifications as reasonably come within the scope of my contribution to the art.

I claim as my invention:

1. A shelter for rodents and similar small-cranium animals for use in an area enveloped by ultrasonic sound waves comprising,
   a vertically upstanding imperforate side wall being generally circularly shaped in horizontal cross-section and having an open top end,
   a downwardly diverging conically shaped roof, and
   means mounting said roof above said side wall in spaced relation to said open top end a distance sufficient to permit the passage of small-cranium animals therebetween,
      said roof being vertically axially aligned with said side wall and terminating at its lower end in a circular edge of greater diameter than the outer diameter of said wall and extending below said open top end of said side wall.

2. The method of grouping rodents and similar small-cranium animals situated within a given area comprising the steps of
   subjecting such area to ultrasonic sound waves having a frequency above 20,000 cycles per second and having a power level of between 15 and 100 decibels to deleteriously affect the nervous system of such animals within such area,
   simultaneously providing a plurality of animal shelters within such area, said shelters providing means for reducing the power level of said ultrasonic sound waves within the shelters by a factor exceeding 99.3 percent, and providing in each of said shelters animal attracting bait.

3. The method of controlling the infestation of rodents and similar small-cranium animals situated within a given area comprising the steps of
   continuously filling such area with ultrasonic sound waves having a frequency above 20,000 cycles per second and having a power level of between 15 and 100 decibels,
   providing a plurality of mobile and easily accessible animal shelters, said shelters providing means for reducing the power level of ambient ultrasonic sound waves having a frequency of above 20,000 cycles per second and having a power level of between 15 and 100 decibels by a factor exceeding 99.3 percent within the interior of the shelters to enable the animals within such area to escape the effects of said sound waves while they are in said shelters, arranging said shelters in a pattern about such area, providing bait within said shelters for attracting the animals.

4. The method as defined in claim 3 and including the step of providing an exterminating agent within each of said shelters.

5. Apparatus for grouping rodents and similar small-cranium animals situated within a given zone comprising,
   sound generating means operative to continuously fill such zone with ultrasonic sound waves having a frequency above 20,000 cycles per second and having a power level of between 15 and 100 decibels,
   a series of readily accessible animal shelters arranged in such zone, and
   animal attracting bait located in each of said shelters, each of said shelters comprising,
      a vertically upstanding imperforate side wall being generally circularly shaped in horizontal cross-section and having an open top end,
      a downwardly diverging conically shaped roof, and
   means mounting said roof above said side wall and in spaced relation to said open top end,
      said roof being vertically axially aligned with said side wall and terminating at its lower end in a circular edge of greater diameter than the outer diameter of said side wall and extending below said open top end of said side wall, said roof and said side wall relationships constituting means for reducing the ambient ultrasonic wave power between the exterior and the interior of said shelters by a factor exceeding 99.3%.

6. Apparatus for grouping rodents and similar small-cranium animals situated within a given zone comprising,
   sound generating means operative to continuously fill such zone with ultrasonic sound waves having a frequency above 20,000 cycles per second and having a power level of between 15 and 100 decibels,
   a series of readily accessible animal shelters arranged in such zone, and
   animal attracting bait located in each of said shelters, each of said shelters comprising,
      a vertically upstanding imperforate side wall being generally circularly shaped in horizontal cross-section and having an open top end,
      a downwardly diverging conically shaped roof, and
   means mounting said roof above said side wall and in spaced relation to said open top end,
      said roof being vertically axially aligned with said side wall and terminating at its lower end in a circular edge of greater diameter than the outer diameter of said side wall and extending below said open top end of said side wall,
      the ratio of the diameter of the roof to the diameter of the side wall being in the order of about 36:28,
      the ratio of the height of the side wall to the vertical distance between the top open end of the side wall and the roof being in the order of about 4:3, and
      the ratio of the diameter of the roof to the over all height of the roof being in the order of about 36:11, said roof and said side wall relationships constituting means for reducing the ambient ultrasonic wave power between the exterior and the interior of said shelters by a factor exceeding 99.3%.

7. For use in an area enveloped by ultrasonic sound waves, a shelter for grouping rodents and similar small-cranium animals comprising:
   a vertically upstanding imperforate side wall being generally circularly shaped in horizontal cross-section and having an open top end,
   a downwardly diverging conically shaped roof, and means mounting said roof above said side wall and in spaced relation to said open top end to provide an area of ingress between said roof and said side wall through which the rodents and similar small-cranium animals can enter the shelter, said roof being vertically axially aligned with said side wall and terminating at its lower end in a circular edge of greater diameter than the outer diameter of said side wall and extending below said open top end of said side wall, said roof and said side wall relationships constituting means for reducing the wave power of ambient ultrasonic sound waves enveloping the area by a factor exceeding 99.3% between the exterior and the interior of said shelter.

8. The shelter as defined in claim 7 and including an exterminating agent within said shelter.

9. The shelter as defined in claim 8 wherein said exterminating agent comprises an animal attracting bait.

References Cited

UNITED STATES PATENTS

| | | | |
|---|---|---|---|
| 716,533 | 12/1902 | Harker | 43—131 |
| 759,030 | 5/1904 | Sheaffer | 43—131 |
| 1,029,144 | 6/1912 | Rich | 119—19 |
| 1,325,069 | 12/1919 | Young | 43—131 |
| 1,573,278 | 2/1926 | Schlesinger | 43—131 |
| 1,633,982 | 6/1927 | Davis | 43—131 |
| 2,034,156 | 3/1936 | Snider | 119—19 |
| 2,245,956 | 6/1944 | Baily | 43—124 X |
| 2,736,127 | 2/1956 | McCann | 43—131 |
| 2,922,999 | 1/1960 | Carlin | 340—15 |
| 3,008,262 | 11/1961 | Ronicker | 43—131 |
| 3,138,138 | 6/1964 | Quittner | 116—137 |
| 3,157,153 | 11/1964 | Moe | 116—137 |
| 3,157,154 | 11/1964 | Moe et al. | 116—137 |

SAMUEL KOREN, *Primary Examiner.*

ALDRICH F. MEDBERY, *Examiner.*